(12) United States Patent
Zhang et al.

(10) Patent No.: US 11,212,592 B2
(45) Date of Patent: Dec. 28, 2021

(54) METHOD AND SYSTEM FOR PERSONALIZED PRESENTATION OF MULTIMEDIA CONTENT ASSEMBLY

(71) Applicant: SHANGHAI JIAO TONG UNIVERSITY, Shanghai (CN)

(72) Inventors: Wenjun Zhang, Shanghai (CN); Yiling Xu, Shanghai (CN); Teng Li, Shanghai (CN); Hao Chen, Shanghai (CN); Yanfeng Wang, Shanghai (CN); Jun Sun, Shanghai (CN); Ning Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 273 days.

(21) Appl. No.: 16/319,516

(22) PCT Filed: Aug. 14, 2017

(86) PCT No.: PCT/CN2017/097417
§ 371 (c)(1),
(2) Date: Jan. 22, 2019

(87) PCT Pub. No.: WO2018/033051
PCT Pub. Date: Feb. 22, 2018

(65) Prior Publication Data
US 2021/0168465 A1 Jun. 3, 2021

(30) Foreign Application Priority Data
Aug. 16, 2016 (CN) .......................... 201610674633.X

(51) Int. Cl.
*H04N 21/6547* (2011.01)
*H04N 21/235* (2011.01)
*H04N 21/431* (2011.01)
*H04N 21/435* (2011.01)
*H04N 21/485* (2011.01)

(52) U.S. Cl.
CPC ..... *H04N 21/6547* (2013.01); *H04N 21/2353* (2013.01); *H04N 21/435* (2013.01); *H04N 21/4312* (2013.01); *H04N 21/4858* (2013.01)

(58) Field of Classification Search
None
See application file for complete search history.

(56) References Cited

U.S. PATENT DOCUMENTS

2002/0069411 A1* 6/2002 Rainville ........... H04N 21/4782
725/37
2004/0114814 A1* 6/2004 Boliek ............... G06K 9/00463
382/233
(Continued)

FOREIGN PATENT DOCUMENTS

| CN | 103988479 A | 8/2014 |
|---|---|---|
| CN | 104412604 A | 3/2015 |

(Continued)

OTHER PUBLICATIONS

International Search Report of PCT/CN2017/097417.
Written opinion of PCT/CN2017/097417.
Published International Application of PCT/CN2017/097417.

*Primary Examiner* — James R Marandi
(74) *Attorney, Agent, or Firm* — Dragon Sun Law Firm, PC; Jinggao Li, Esq.

(57) ABSTRACT

The present disclosure provides a method and a system for personalized presentation of a multimedia content assembly, including: presenting, on a server, by using a presentation mode in which one or more presentation layers superimpose, a media content component, and sending signaling information for describing a presentation layer layout to a client; presenting, on the client, a multimedia content assembly in a personalized manner according to the signaling information of the presentation layer. In the present disclosure, a content provider can instruct a user to perform combination (Continued)

presentation on multi-channel content at a client device vendor, and adjust a layout by a reduced update instruction. In addition, the present disclosure provides a media service applicable to a case in which terminal devices are different and user needs are different.

9 Claims, 5 Drawing Sheets

(56) References Cited

U.S. PATENT DOCUMENTS

| | | | | |
|---|---|---|---|---|
| 2007/0005795 | A1* | 1/2007 | Gonzalez | H04N 19/186 709/232 |
| 2010/0225815 | A1* | 9/2010 | Khatri | H04N 21/4312 348/569 |
| 2015/0020119 | A1* | 1/2015 | Kim | H04N 21/4312 725/59 |
| 2015/0074243 | A1* | 3/2015 | Russell | H04L 65/4092 709/219 |
| 2015/0261425 | A1* | 9/2015 | Marusich | G06F 3/04847 715/719 |
| 2017/0272830 | A1* | 9/2017 | Richman | H04N 21/812 |

FOREIGN PATENT DOCUMENTS

| | | |
|---|---|---|
| CN | 104737512 A | 6/2015 |
| WO | 2015186273 A1 | 12/2015 |

* cited by examiner

METHOD AND SYSTEM FOR PERSONALIZED PRESENTATION OF MULTIMEDIA CONTENT ASSEMBLY

CROSS-REFERENCE TO RELATED APPLICATIONS

This application is a national stage application of PCT Application No. PCT/CN2017/097417. This Application claims priority from PCT Application No. PCT/CN2017/097417, filed Aug. 14, 2017, and CN Application No. 201610674633.X, filed Aug. 16, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technical Field

The present disclosure relates to a personalized presentation method in the field of Internet technologies and digital media technologies, and specifically, to a method and system for personalized presentation of a multimedia content component.

Related Art

In the context of increasing maturity of development of Internet technologies and digital media technologies, media services are also becoming more enriched, complicated and personalized. A content provider needs to perform a more detailed description on presentation of media content, and a user has more selections and requirements on service content and presentation of the service content. A multimedia content assembly refers to content that can be independently encoded and decoded in a multimedia service or a program and belongs to a particular type. In a media service, content provider may provide media content components such as diversified video, text, and advertisements that need to be presented separately or in combination from different channels. These components need to appear in a specific area for display in a specific mode at a specific time. This requires the content provider to inform a user device of an area in which and a time at which corresponding media content should be presented. At the same time, when consuming a multimedia content component, to some extent, a user also has a need to change a layout, and so on. This also requires the content provider to inform the user whether a change can be made to presentation of a particular piece of content.

Conventionally, service providers usually assemble multiple pieces of media content into one single piece of media content before a server sends the multiple pieces of media content. Therefore, there is no complex signaling mechanism to instruct a user to operate on presentation. This is inconsistent with multi-channel, and diversified new media content consumption needs, and does not meet a personalized presentation need of the user.

Based on searching, it is found that in a patent application with the publication number CN104471953A and the application number 201380035794.9, a method used for providing personalized content that includes media content and that is determined and ranked is disclosed, including the following steps: receiving, in a control channel, a control flow including time control information for describing content sorting; receiving, a media stream including sorted media content; and controlling, by using the control information, presentation of personalized content, where the sorting includes a first live program, followed by a second live program, and the method further includes a step of detecting overlapping of the first and the second live programs. The patent controls presentation of personalized content by sorting media content. However, this still does not resolve the foregoing problem.

Therefore, a heretofore unaddressed need exists in the art to address the aforementioned deficiencies and inadequacies.

SUMMARY

In view of defects in the prior art, the present disclosure provides a method and system for personalized presentation of a multimedia content assembly, and a new signaling mechanism is designed for presentation of a multimedia content component. The mechanism is used for helping content providers to inform a client device of information such as a location, a size, a fitting type, whether can be adjusted, and transparency of presentation of media content. In addition, a presentation layout can be updated, so that media content component can be played at client devices.

According to a first aspect of the present disclosure, a method for personalized presentation of a multimedia content assembly is provided, including:

presenting, on a server, a media content component by using a presentation mode in which one or more presentation layers superimpose, and sending signaling information for describing a presentation layer layout to a client; and presenting, on a client, a multimedia content assembly in a personalized manner according to the signaling information of the presentation layers.

Preferably, the signaling information for describing the presentation layer layout includes one or more of the following content: a sequence number, a playback device number, a central location and a length and width of a display area, a layer display order, and a fitting type of media content relative to the display area, of each layer, whether the layer can be adjusted, and transparency of the layer.

Further, when the layout needs to be updated, the server is configured to transmit signaling information for updating the presentation layout to the client.

Preferably, the signaling information for updating the presentation layout includes one or more of: deleting a layer, adding a new layer, changing a display order of a layer, changing a display variable of a layer, and informing the client how to change current presentation.

Preferably, when the layout needs to be updated, the server is configured to change a current layout by changing a table of signaling information of all layers.

Preferably, the server is configured to inform the client of signaling information of a presentation layer that corresponds to consumption and that is of the media content component, and the client is configured to implement correct presentation after parsing the signaling information.

Preferably, the server further includes a descriptor for describing a presentation layer corresponding to media content, the descriptor clearly and accurately describe information including a number of a layer corresponding to presentation of the media content, a number of a layer in which presentation can be exchanged, and a number of a layer in which presentation can be copied, and a user may freely replace or copy a presentation layer by using information about a location at which a media content component can be replaced and that is informed by the server, or information about a location at which a media content component can be copied and that is informed by the server, and when a tag for indicating whether the layer can be adjusted indicates that the layer can be adjusted, adjust a display location size, a display order, a fitting manner, or transparency of the layer in a personalized manner, while presentation of other users are not affected.

According to a second aspect of the present disclosure, a server configured to implement the foregoing method is provided, including:

a signaling configuration interface and generation module, configured to obtain layout information about a presentation layer layout, or layout update information and information corresponding to a content component, and make the obtained information into signaling information;

a signaling version management module, configured to manage version numbers of signaling information, so as to send correct signaling information to a client; and a signaling sending module, configured to pack the signaling information into a data packet in accordance with a transmission protocol, and send the data packet to a specified client.

According to a third aspect of the present disclosure, a client device configured to implement the foregoing method is provided, including:

a signaling receiving and parsing module, configured to receive the data packet including signaling information, parse the data packet into the signaling information, and check a version number, so as to transfer correct signaling information to a rendering module; and the rendering module, configured to: according to the signaling information transferred by the signaling receiving and parsing module, correctly present each presentation layer based on the layout, and correspondingly display a corresponding media content component and the presentation layer.

The client device further includes a user operation interface module, where the user operation interface module is configured to: according to variable flags that are of the presentation layers and that are in the signaling information, inform a user of types and a range of the presentation layers that are variable, and transfer obtained personalized adjustment command of the user on the presentation layer to the rendering module for related adjustment; and the rendering module is configured to change the presentation layout at any time according to a personalized adjustment command of the user operation interface module.

According to a fourth aspect of the present disclosure, a system for personalized presentation of a multimedia content assembly is provided, including the server and the client device, where the server is configured to provide media content component by using the presentation mode in which the one or more presentation layers superimpose, and send the signaling information for describing a presentation layer layout to the client device; and the client device is configured to present the multimedia content assembly in a personalized manner according to the signaling information that is of the presentation layers sent by the server.

Compared with the prior art, the present disclosure has the following beneficial effects:

Adopting the technical solutions of the present disclosure can resolve a problem of a service mode in which existing content providers integrate multimedia content on source ends and then deliver the integrated multimedia content to users, so that a content provider can instruct a user to perform combination presentation on multi-channel content at a client device, and appropriately adjust a layout through a reduce update instruction. In addition, adopting the technical solutions resolves a problem that an existing system cannot flexibly provide more personalized media services, making a media service applicable to a case in which terminal devices are different and user needs are different.

Certain terms in the specification are defined herein:

MMT: the MMT is Multi Media Transmission, and Multi Media Transmission is a multimedia transmission protocol defined by MPEG.

PA message: the PA message is a packet access information file, and information may be understood as a message file that is used for transferring information such as packet parsing and presentation and that is regularly sent (updating every 0.5 seconds) in a MMT protocol.

MP table: the MP table should be included in the PA message, and mainly describes basic information about media content consumption.

Asset: the Asset is used for constructing a multimedia data set presented by multimedia presentation. Herein, the Asset may be simply understood as a video stream, an audio stream file, or the like, and one Asset is a set of MPU logical sets carrying encoded media data and sharing a same Asset ID; and MPU: the MPU is a minimum media data element that can be independently parsed into and that is specified in the MMT protocol.

BRIEF DESCRIPTION OF THE DRAWINGS

Based on reading and referring to a detailed description of the following accompany drawings on non-limited embodiments, other features, objectives and advantages of the present disclosure may become apparent.

DETAILED DESCRIPTION

Figure 1:
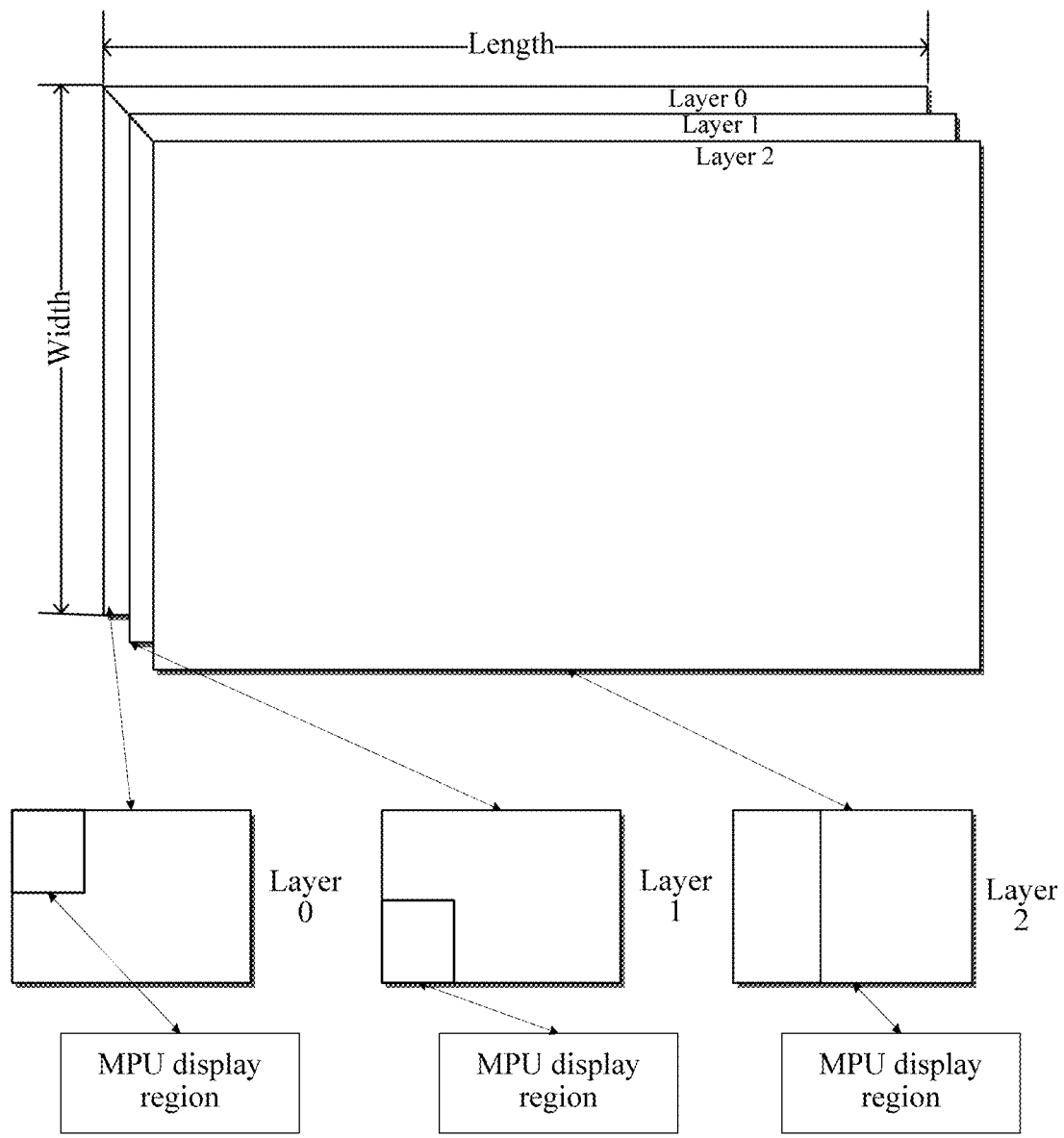
FIG. 1 is a schematic diagram of signaling of presentation according to an embodiment of the present disclosure.
Figure 2:
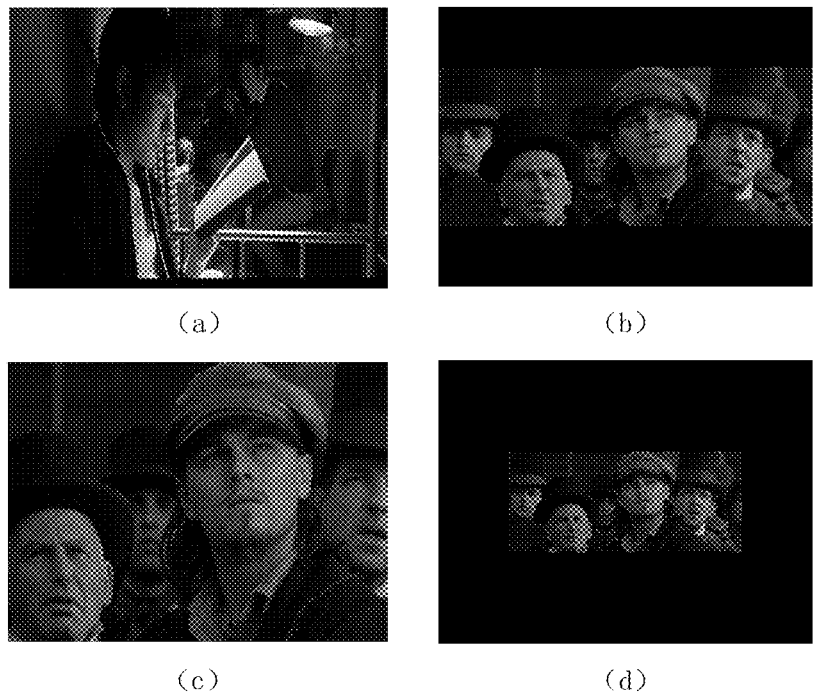
FIG. 2 is a schematic diagram of a fitting manner of presentation according to an embodiment of the present disclosure, where a is laying flat, b is fitting through enlarging, c is fitting through narrowing, and d is an original image.
Figure 3:
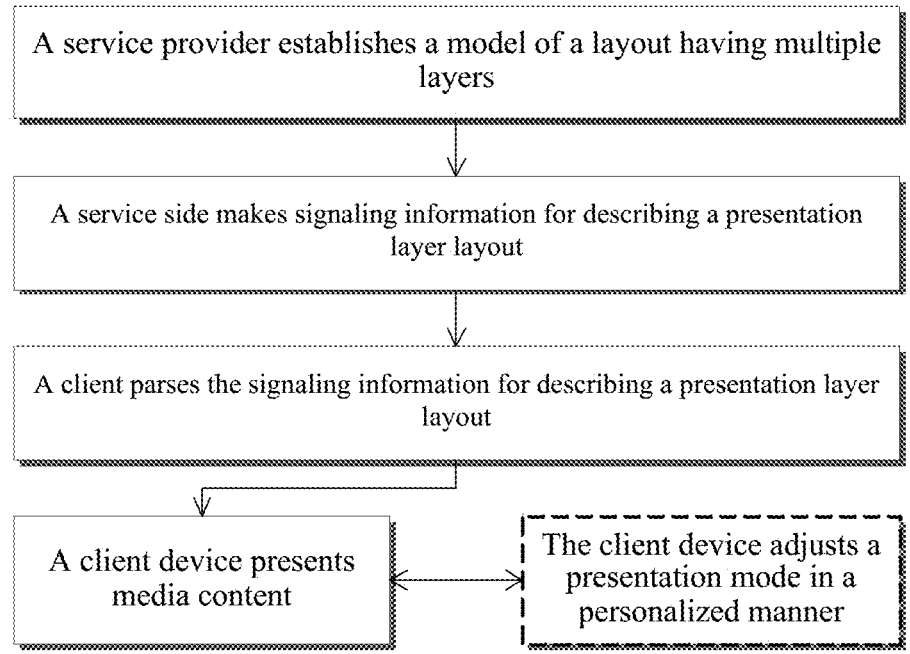
FIG. 3 is a flowchart of transferring signaling and implementing personalized presentation by various modules according to the present disclosure.
Figure 4A:
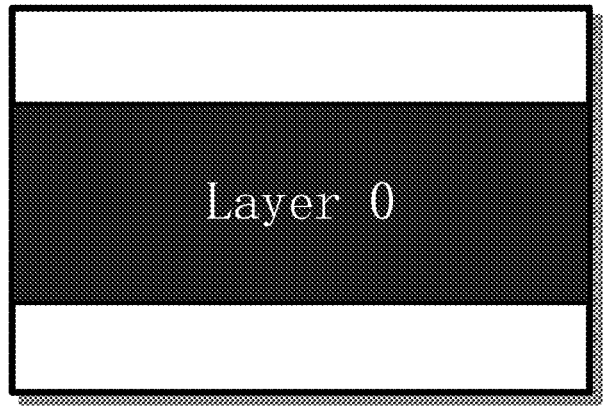
FIG. 4(*a*) to FIG. 4(*e*) are diagrams of an implementing process of a specific application embodiment according to the present disclosure.
Figure 4B:
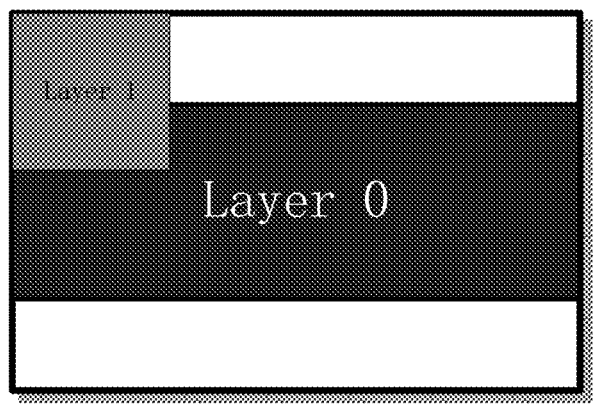
Figure 4C:
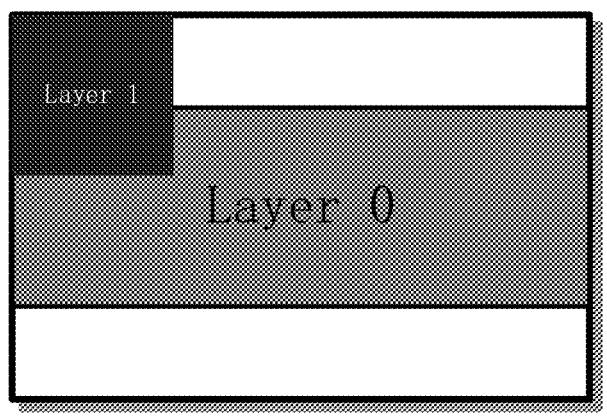
Figure 4D:
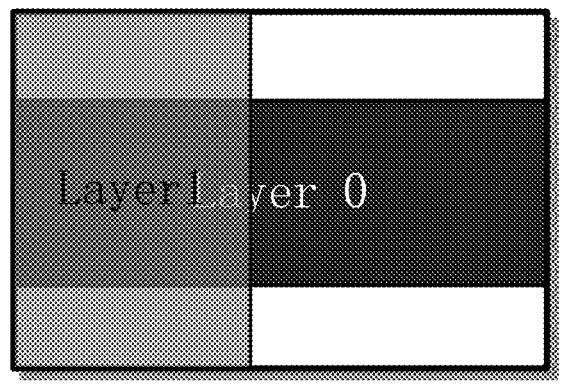
Figure 4E:
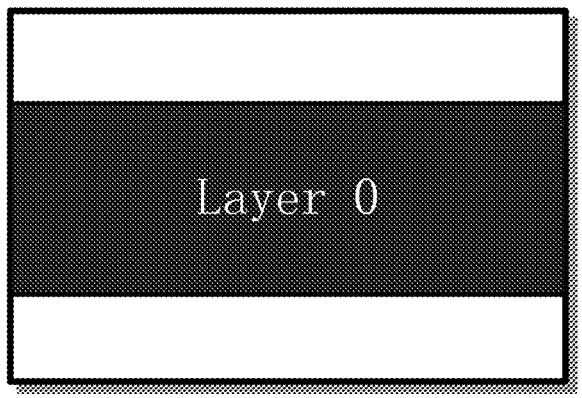

The following describes in detail the present disclosure with reference to specific embodiments. The following embodiments help a person skilled in the art further understand the present disclosure, but does not limit the present disclosure in any form. It should be noted that a person of ordinary skill in the art may make various changes and improvements without departing from the concept of the present disclosure. These all belong to the protection scope of the present disclosure.

Conventionally, service providers usually assemble multiple pieces of media content into one single piece of media content before a server side sends the multiple pieces of media content. Therefore, there is no complex signaling mechanism to instruct a user to operate on presentation. This is inconsistent with multi-channel, and diversified new media content consumption needs, and does not meet a personalized presentation need of the user.

In view of the problem, in the present disclosure, on a server, a presentation mode is described as superimposed presentation of one or more presentation layers. The inner of each of the presentation layers has a display area for displaying corresponding media content, and information about a display area, a layer display order, a fitting type of media content relative to a display area, of each layer, whether the layer can be adjusted, transparency of the layer, and the like are described and sent to a client.

When a layout needs to be updated, the server may select a manner by deleting a layer, adding a new layer, changing a layer display order, changing a display variable of a layer, or the like, to inform the client how to change current presentation. In addition, the server may alternatively change a current layout by changing a table of signaling information of all the layers.

In the aspect of docking media content, the client only needs to inform a user of a number of a layer corresponding to consumption of a media content component. In this way, correct presentation can be implemented. The user may alternatively freely replace, or copy a presentation layer of media by using information about a location at which a media content component can be replaced and that is informed by the server; information about a location at which a media content component can be copied and that is informed by the server, or the like, and when a tag for indicating whether a layer can be adjusted represents that the layer can be adjusted, adjust a display location size, a display order, a fitting manner, transparency of the layer, or the like in a personalized manner, while presentation of other users are not affected.

The following describes the present disclosure with reference to specific implementing details, so as to make the technical solutions of the present disclosure be further understood.

1. Signaling Table Describing a Presentation Layout

The signaling table is configured to clearly and accurately describe the detailed information such as a sequence number, a playback device number, a central location and a length and width of a display area, a display order, a fitting manner, whether can be adjusted or not, and transparency of each presented presentation layer. Information fields are not limited to these several types, and a description field may be added according to an actual display requirement. During specific application, the signaling table is used for instructing presentation, and may be produced or specified by a program provider. The signaling information is generated at the server and transferred to a client at a user end.

ISO/IEC 23008-1 MPEG Media Transport (MMT) standard is used as an example to describe signaling information including a presentation layout. The signaling table is added into a PA message that provides signaling in MMT, and specifically mainly includes the following 14 fields:

table_id: this field describes an identifier of the table.

version: this field describes a version of the table, an updated signaling table has a new version, and may replace an original signaling table.

length: this field describes a length of bytes of the table, which is from a next byte of this field to the last field of the descriptor.

number_of_layer: this field describes a quantity of presentation layers described in the table.

layer_id: this field describes a marked number of a presentation layer currently described in the table.

device_id: this field describes a device number of presentation corresponding to the currently described presentation layer in the table. When the number is "0", it indicates that the presentation is on a default device.

center_x: this field describes a horizontal coordinate of a central location of an area presenting media content in the currently described presentation layer in the table, which is calibrated by using a percentage of pixels of the center of the display area in horizontal pixels of the whole layer.

center_y: this field describes a vertical coordinate of the central location of the area presenting the media content in the currently described presentation layer in the table, which is calibrated by using a percentage of pixels of the center of the display area in vertical pixels of the whole layer.

width: this field describes a width of the area presenting the media content in the currently described presentation layer in the table, which is calibrated by using a percentage of pixels of the display area in horizontal pixels of the whole layer.

height: this field describes a height of the area presenting the media content in the currently described presentation layer in the table, which is calibrated by using a percentage of pixels of the display area in vertical pixels of the whole layer.

display_order: this field describes a display order of the currently described presentation layer in all the presentation layers in the table. When the order is "0", it indicates a default layer, a layer having a smaller marked number is a lower layer, and a layer having a larger marked number is an upper layer. Among the layers, there may be a layer without a number, but a number of each of the layers should not be the same as another number.

fitting_type: this field describes a fitting type of an image when the media content is played in the currently described presentation layer. When the fitting type is "0", it represents laying flat, that is, changing a resolution and a length-width ratio of an MPU, and the image is laid flat in a whole specified area; when the fitting type is "1", it indicates fitting through enlarging, that is, not changing the resolution and the length-width ratio of the MPU, the image is enlarged from the smallest until a width/height of the image fits a screen in a horizontal/vertical direction, and remaining parts are filled with black; when the fitting type is "2", it indicates fitting through narrowing, that is, not changing the resolution and the length-width ratio of the MPU, the image is narrowed from the largest until a width/height of the image fits a screen in a horizontal/vertical direction, and remaining parts are pruned; when the fitting type is "3", it indicates an original image, that is, not changing the resolution and the length-width ratio of the MPU, a location of the image is on the center of the specified area, and if the image does not satisfy with the display area, an insufficient part is filled with black or an excess part is pruned; and when the fitting type is "5", it indicates a panorama, that is, a video is played through being fitted to the layers based on a panoramic video play requirement. The fitting type is not limited to the foregoing five types.

adjust_enable_flag: this field describes a flag indicating whether the currently described presentation layer can be adjusted. When the flag is "0", it indicates that a user side cannot adjust the layer; and when the flag is "1", it indicates that the user side can adjust a device, a display area size, a location, transparency, a fitting type or the like of the layer.

transparency: this field current describes a transparency degree of the currently described presentation layer in the table.

Generally, it is recommended that the signaling table is added only when there is a significant change in a presentation mode, to reduce redundancy, but it is not limited to such condition. A recommended format is shown in the following table, but it is not limited to this format:

| Syntax | Value | No. of bits | Mnemonic |
|---|---|---|---|
| Layer_Display_Table ( ) { | | | |
|   table_id | | 8 | uimsbf |
|   version | | 8 | uimsbf |
|   length | | 16 | unimbf |
|   number_of_layer | N1 | 8 | unimbf |
|   for(int i = 0; i <N1; i++) { | | | |
|     layer_id | | 8 | unimbf |
|     device_id | | 8 | unimbf |
|     center_x | | 8 | unimbf |
|     center_y | | 8 | unimbf |
|     width | | 8 | unimbf |
|     height | | 8 | unimbf |
|     display_order | | 8 | unimbf |
|     fitting_type | | 3 | bslbf |
|     adjust_enable_flag | | 1 | bool |
|     reserved | '1111' | 4 | bslbf |
|     transparency | | 8 | unimbf |
|   } | | | |
| } | | | |

2. Signaling Table Updating a Presentation Layout

In the signaling table, an operation such as deleting, adding, changing a display order, or adjusting a display parameter can be performed on each of excess layers based on an already existing presentation layout. The update operation manner is not limited to these types, and the operation manner may increase in quantity or be refined according to an actual display requirement. The signaling table is similar to the foregoing signaling table describing the presentation layout, and the signaling information may also be generated and transferred from a server to a user on his client device.

ISO/IEC 23008-1 MPEG Media Transport (MMT) standard is used as an example, to describe a method of describing signaling information for updating a presentation layout. The signaling table is added into a PA message that provides signaling in MMT, and mainly includes the following 4 fields except for the already described fields:

layer_delete_flag: this field describes whether there is a deleted layer. When the flag is "0", it indicates there is no deleted layer, and when the flag is "1", it indicates there is a deleted layer. If there is a deleted layer, the number of the deleted layer is given.

layer_add_flag: this field describes whether there is an added layer. When the flag is "0", it indicates there is no added layer, and when the flag is "1", it indicates there is an added layer. If there is an added layer, whole information about the added layer is given.

layer_display_order_flag: this field describes whether there is a layer of which a display order needs to be changed. When the flag is "0", it indicates there is no layer of which an order needs to be changed, and when the flag is "1", it indicates there is a layer of which an order needs to be changed. If there is a layer of which an order needs to be changed, a layer number of the layer needing to be adjusted and a new given layer display order is given.

layer_adjust_flag: this field describes whether there is an adjusted layer. When the flag is "0", it represents there is no adjusted layer, and when the flag is "1", it represents there is an adjusted layer. If there is an adjusted layer, parameter information of the adjusted layer after adjusted is given.

Generally, it is recommended that the signaling table is added when there is a small change in a presentation mode, to reduce redundancy, but it is not limited to such condition. A recommended format is shown in the following table, but it is not limited to this format:

| Syntax | Value | No. of bits | Mnemonic |
|---|---|---|---|
| Layer_Display_Update_Table ( ) { | | | |
|   table_id | | 8 | uimsbf |
|   version | | 8 | uimsbf |
|   length | | 16 | unimbf |
|   layer_delete_flag | | 1 | bool |
|   layer_add_flag | | 1 | bool |
|   layer_display_order_flag | | 1 | bool |
|   layer_change_flag | | 1 | bool |
|   reserved1 | '1111' | 4 | bslbf |
|   if(layer_delete_flag){ | | | |
|     layer_id | | 8 | unimbf |
|   } | | | |
|   if(layer_add_flag){ | | | |
|     new_layer_id | | 8 | unimbf |
|     device_id | | 8 | unimbf |
|     center_x | | 8 | unimbf |
|     center_y | | 8 | unimbf |
|     width | | 8 | unimbf |
|     height | | 8 | unimbf |
|     display_order | | 8 | unimbf |
|     fitting_type | | 3 | bslbf |
|     adjust_enable_flag | | 1 | bool |
|     reserved2 | '1111' | 4 | bslbf |
|     transparency | | 8 | unimbf |
|   } | | | |
|   if(layer_display_order_flag){ | | | |
|     layer_id | | 8 | unimbf |
|     new_layer_display_order | | 8 | unimbf |
|   } | | | |
|   if(layer_change_flag){ | | | |
|     layer_id | | 8 | unimbf |
|     device_id | | 8 | unimbf |
|     center_x | | 8 | unimbf |
|     center_y | | 8 | unimbf |
|     width | | 8 | unimbf |
|     height | | 8 | unimbf |
|     display_order | | 8 | unimbf |
|     fitting_type | | 3 | bslbf |
|     adjust_enable_flag | | 1 | bool |
|     reserved3 | '1 1111' | 4 | bslbf |
|     transparency | | 8 | unimbf |
|   } | | | |
| } | | | |

3. A Descriptor Describing a Presentation Layer Corresponding to Media Content

The descriptor is designed to clearly and accurately describe information including a number of a layer of presentation corresponding to the media content, a number of a layer in which presentation can be replaced, a number of a layer in which presentation can be copied, and the like. The information field is not limited to these several types, and the description field may increase in quantity according to an actual presentation requirement. The signaling table is similar to the foregoing signaling table describing the presentation layout, and the signaling information may also be generated and transferred from a server to a user.

ISO/IEC 23008-1 MPEG Media Transport (MMT) standard is used as an example, to describe a method of describing a presentation layer corresponding to media content. A descriptor of MPU of a content component is provided in an MP table in MMT, and mainly includes the following 11 fields except for the already described fields:

descriptor_tag: this field is a tag name used for identifying a type of the descriptor, and can locate a type to which the descriptor belongs.

descriptor_length: this field is used for identifying a length of bytes of the table, which is from a next byte of this field to the last field of the descriptor.

number_of_mpu: this field is used for identifying a quantity of layers that should be presented by a current MPU.

mpu_sequence_number: this field is used for identifying a sequence number of the current MPU, a sequence number of the first MPU in the Asset should be "0", a sequence number of each subsequent MPU is added with "1" both based on a current MPU, and each sequence number is unique within the Asset.

number_of_layer: this field is used for identifying a number of a layer that should be presented by the current MPU.

layer_exchange_flag: this field is used for identifying, when the current MPU is correctly presented into a particular layer, whether the current MPU can exchange a presentation layer with that of an MPU presented in another layer. When the flag is "0", it indicates presentation is performed only in accordance with numbers of layers listed by the descriptor, and when the flag is "1", it indicates that the user side may present the MPU after exchanging the layer of the MPU with the layer of the another MPU.

layer_copy_flag: this field is used for identifying, when correctly presented into a particular layer, whether the current MPU can be copied and presented into another layer. When the flag is "0", it represents presentation is performed only in accordance with numbers of layers listed by the descriptor, and when the flag is "1", it represents that the user side may copy and present the MPU into the another layer. When presentation is performed based on copying, a client is configured to overwrite MPU content in an original layer.

number_of_exchange_layer: this field is used for identifying a quantity of layers that can be exchanged with the layer of the current MPU for presentation.

exchange_layer_id: this field is used for identifying numbers of the layers that can be exchanged with the layer of the current MPU for presentation.

number_of_copy_layer: this field is used for identifying a quantity of layers into which the current MPU can be copied and presented.

copy_layer_id: this field is used for identifying numbers of the layers into which the current MPU can be copied and presented.

A recommended format is shown in the following table, but it is not limited to this format:

| Syntax | Value | No. of bits | Mnemonic |
|---|---|---|---|
| MPU_consumption_descriptor( ) { | | | |
|     descriptor_tag | | 16 | uimsbf |
|     descriptor_length | | 16 | uimsbf |
|     number_of_mpu | N1 | 8 | unimbf |
|     for(i = 0; i <N1; i++) { | | | |
|         mpu_sequence_number | | 32 | unimbf |
|         number_of_layer | N2 | 8 | unimbf |
|         for(i = 0; i <N1; i++){ | | 8 | unimbf |
|             layer_id | | | bool |
|         } | | | |
|         layer_exchange_flag | | 1 | |
|         layer_copy_flag | | 1 | |
|         reserved | '11 1111' | 6 | bslbf |
|         if(layer_exchange_flag){ | | | |
|             number_of_exchange_layer | N2 | 8 | unimbf |
|             for(i = 0; i <N2; i++) { | | | |
|                 exchange_layer_id | | 8 | unimbf |
|             } | | | |
|         } | | | |
|         if(layer_copy_flag){ | | | |
|             number_of_copy_layer | N3 | 8 | unimbf |
|             for(i = 0; i <N3; i++) { | | | |
|                 copy_layer_id | | 8 | unimbf |
|             } | | | |
|         } | | | |
|     } | | | |
| } | | | |

Based on the foregoing description of technical features, in an embodiment, a main implementation procedure of a method for personalized presentation of multimedia content is:

1. A service provider obtains media content from one or more content sources, and establishes a presentation layout of a combination of the media content according to a service that needs to be provided.

2. The service provider and a multimedia server analyze information about the presentation layout that is needed, make signaling information in accordance with the foregoing formats of the signaling tables, and use the signaling information as a content component and send the signaling information to a client.

3. The client parses the signaling information of the presentation, presents a plurality of layers in an order on a display device of the client according to a signaling table describing the presentation layout, and then plays the media content into a corresponding layer according to a descriptor of a presentation layer corresponding to the media content.

4. When the signaling information allows, the client may inform a user that some presentation layers may be adjusted, and the client adjusts the presentation in a personalized manner according to a user instruction.

Figure 5:
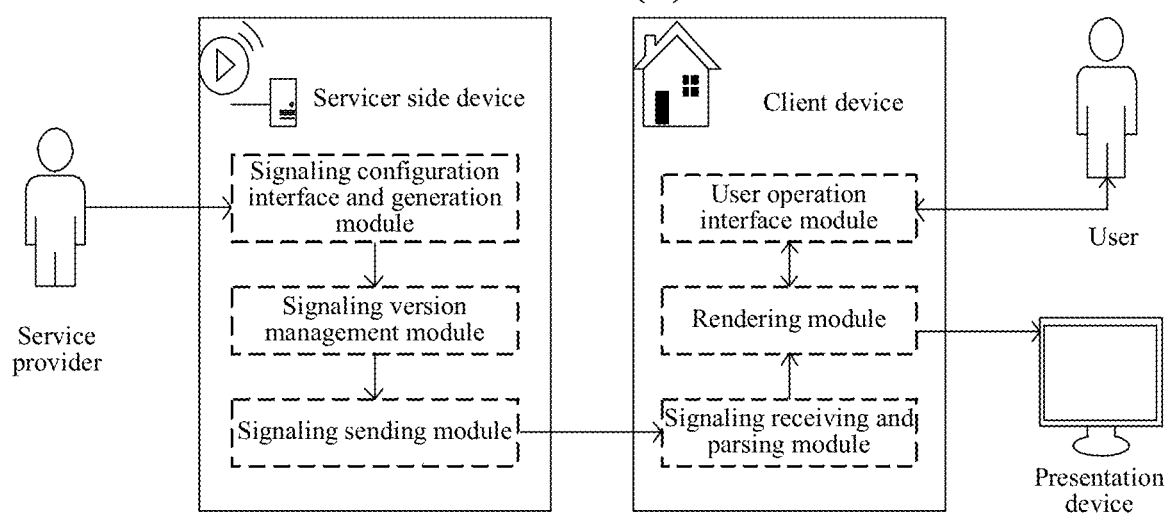
FIG. 5 is structural block diagram of the system of personalized presentation of multimedia assembly, according to an embodiment of the present disclosure.

As shown in FIG. 5, in an embodiment of the present disclosure, a server configured to implement the foregoing method is provided, including:

a signaling configuration interface and generation module, where the module needs to open a graphical or programmatic language interface to the service provider, to obtain information about a presentation layout (or layout update information) and information corresponding to a content component, and make the information into signaling information in accordance with requirements in this patent;

a signaling version management module, where the module is responsible for management of version numbers of the signaling information, and ensures that correct signaling information is sent to a client; and a signaling sending module, where the module is configured to pack the signaling information into a data packet in accordance with a transmission protocol, and transmit the signaling information to a specified client through a channel.

As shown in FIG. 5, in an embodiment of the present disclosure, a client device configured to implement the foregoing method is provided, including:

a signaling receiving and parsing module, where the signaling receiving and parsing module is configured to correctly receive the data packed including the signaling information from the channel, parse the data packet into the signaling information, and check a version number, to ensure that the correct signaling information is transferred to a rendering module;

the rendering module, where the rendering module is configured to, according to a requirement of the signaling information, correctly present each layer on a client display device in accordance with a correct layout, correspondingly display a corresponding media content component and the layer, and is further configured to change the presentation layout at any time according to operation information of a user operation interface module.

the user operation interface module, where the user operation interface module is configured to, in accordance with requirements of variable flags that are of the layers and that are in the signaling information and in accordance with an execution manner of client software, inform a user of types and a range of the layers, and transfer obtained information that the user changes presentation of the layers to the rendering module for related adjustment.

Further, in a specific application embodiment, assignment of each field of the signaling information in each scenario is listed respectively. A dark color represents media resources of an Asset 1. A light color represents media resources of an Asset 2.

(1) An initial layout is shown in FIG. 4 (a), content that is played is a part of MPU in the Asset 1, and a fitting manner is fitting through enlarging.

| Field | Value |
|---|---|
| Layer_display_table 1 | |
| table_id | 0x21 |
| version | 0x00 |
| length | / |
| number_of_layer | 1 |
| layer_id | 0 |
| device_id | 0 |
| center_x | 50 |
| center_y | 50 |
| width | 100 |
| height | 100 |
| display_order | 0 |
| fitting_type | 1 |
| adjust_enable_flag | 0 |
| reserved | / |
| transparency | 0 |
| Asset 1 | |
| MPU_consumption_descriptor | |
| descriptor_tag | TBD |
| descriptor_length | / |
| number_of_mpu | / |
| mpu_sequence_number | / |
| number_of_layer | 1 |
| layer_id | 0 |
| layer_exchange_flag | 1 |
| layer_copy_flag | 0 |
| number_of_exchange_layer | 1 |
| exchange_layer_id | 1 |

(2) An update layout is shown in FIG. 4 (b), a new layer is added, content that is played is a part of MPU in the Asset 2, and a fitting manner is laying flat.

| Field | Value |
|---|---|
| Layer_display_update_table 1 | |
| table_id | 0x22 |
| version | 0x00 |
| length | / |
| layer_delete_flag | 0 |
| layer_add_flag | 1 |
| layer_display_order_flag | 0 |
| layer_adjust_flag | 0 |
| number_of_layer | 1 |
| layer_id | 1 |
| device_id | 0 |
| center_x | 20 |
| center_y | 25 |
| width | 25 |
| height | 30 |
| display_order | 1 |
| fitting_type | 0 |

-continued

| Field | Value |
|---|---|
| adjust_enable_flag | 1 |
| reserved | / |
| transparency | 0 |
| Asset 2 MPU_consumption_descriptor | |
| descriptor_tag | TBD |
| descriptor_length | / |
| number_of_mpu | / |
| mpu_sequence_number | / |
| number_of_layer | 1 |
| layer_id | 1 |
| layer_exchange_flag | 1 |
| layer_copy_flag | 0 |
| number_of_exchange_layer | 1 |
| exchange_layer_id | 0 |

(3) Because information about layers that can be replaced in each MPU_consumption_descriptor of the two Assets are both described respectively, the client may perform an exchange between content in the two layers for display according to the information, and the server does not need to update the signaling information. Its schematic diagram is shown in FIG. 4 (c).

(4) Because in the Layer_display_update_table 1, a variable flag is "1" in the description of layer 1, it indicates that a user may perform a change in the layer. Therefore, the user may change a size, a center location, transparency, or the like of a display area of the layer. Its schematic diagram is shown in FIG. 4 (d).

(5) When an Asset 2 resource in the layer 1 is played, there is no corresponding MPU to be corresponded to the layer for display, and therefore the layer is automatically removed from the client. Its schematic diagram is shown in FIG. 4 (e).

In the present disclosure, a presentation mode in which one or more presentation layers superimpose is adopted. In addition, based on a signaling mechanism, guidance is performed on presentation that is of multiple content components and that is provided by the server side in a multimedia service, thereby resolving a problem that multimedia content of the multiple components cannot be effectively played and personalized media services cannot be flexibly provided.

Figure 6:
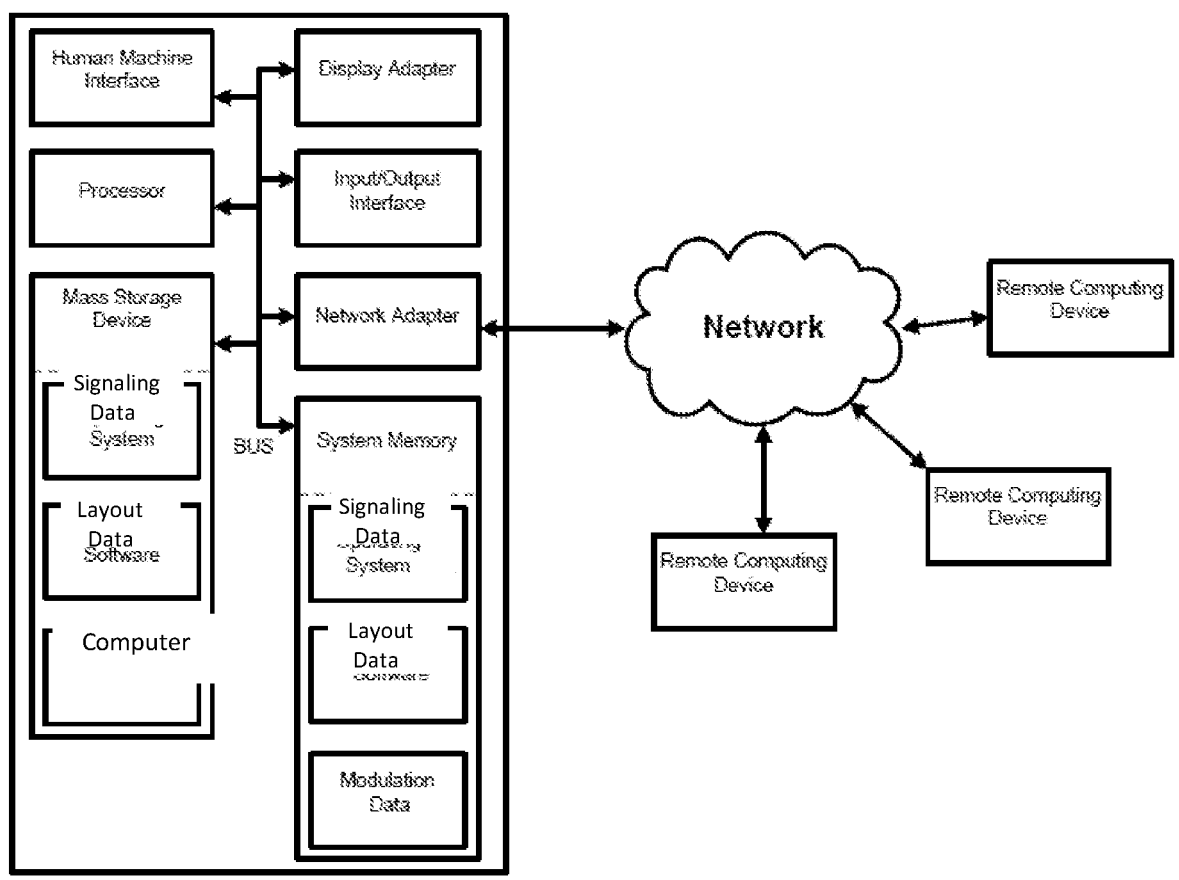
FIG. 6 is a block diagram illustrating a computing system in which the present system and method can operate.

Referring to FIG. 6, the methods and systems of the present disclosure can be implemented on one or more computers. Specifically, a server and any client device can be one or more computers or remote computing devices in FIG. 6. The methods and systems disclosed can utilize one or more computers to perform one or more functions in one or more locations. The processing of the disclosed methods and systems can also be performed by software components. The disclosed systems and methods can be described in the general context of computer-executable instructions such as program modules, being executed by one or more computers or devices. For example, the program modules such as the signaling configuration interface and generation module, the signaling version management module, and the signaling sending module can be located in the server in a central location, whereas the signaling receiving and parsing module, the rendering module, the user operation interface module, can be located in each remote client device (personal user devices) at respective user's location. These program modules can be stored on the mass storage device of the server and one or more client devices. Each of the operating modules can comprise elements of the programming and the data management software.

The components of the server and/or client device can comprise, but are not limited to, one or more processors or processing units, a system memory, a mass storage device, an operating system, a system memory, an Input/Output Interface, a display device, a display interface, a network adaptor, and a system bus that couples various system components. The server and one or more client devices can be implemented over a wired or wireless network connection at physically separate locations, implementing a fully distributed system. By way of example, a remote client device can be a personal computer, portable computer, smartphone, a network computer, a peer device, or other common network node, and so on. Logical connections between the server and one or more client devices can be made via a network, such as a local area network (LAN) and/or a general wide area network (WAN).

The foregoing describes specific embodiments of the present disclosure. It should be understood that the present disclosure is not limited to the foregoing specific implementation, a person skilled in the art may make various variants or modifications within the scope of the claims, and this does not affect substantive content of the present disclosure.

What is claimed is:

1. A method for personalized presentation of a multimedia content assembly, comprising:
   providing, on a server, a media content component by using a presentation mode in which one or more presentation layers superimpose;
   sending signaling information for describing a presentation layer layout from the server to a client device; and
   presenting, on the client device, a multimedia content assembly in a personalized manner according to the signaling information of the presentation layers;
   wherein when the layout needs to be updated, the server is configured to transmit signaling information for updating the presentation layout to the client device;
   wherein the signaling information for updating the presentation layout comprises: deleting a layer, adding a new layer, changing a display order of a layer, changing a display variable of a layer, and informing the client how to change current presentation;
   wherein a descriptor for describing a presentation layer corresponding to media content is located on the server, and the descriptor is configured to describe information comprising a number of a layer of presentation corresponding to the media content, a number of a layer in which presentation to be exchanged, and a number of a layer in which presentation to be copied, and the client device freely replaces or copies a presentation layer by using information about a location at which a media content is replaced and that is informed by the server, or information about a location at which a media content component to be copied and that is informed by the server, and when a tag for indicating whether a layer can be adjusted indicates that the layer can be adjusted, adjusts a display location size, a display order, a fitting manner, or transparency of the layer in a personalized manner, while presentation of other users are not affected.

2. The method for personalized presentation of the multimedia content assembly according to claim 1, further comprising:
   describing the signaling information about the presentation layer layout, wherein the signaling information comprises a sequence number, a playback device number, a central location and a length and width of a display area, a layer display order, and a fitting type of media content relative to the display area, of each layer, whether the layer can be adjusted, and transparency of the layer.

3. The method for personalized presentation of the multimedia content assembly according to claim 1, wherein when the layout needs to be updated, the server is configured to instruct the client device to change a current layout by sending change signaling information for describing a presentation layer layout.

4. The method for personalized presentation of the multimedia content assembly according to claim 1, further comprising:
informing, by the server, the client device of signaling information of a presentation layer that corresponds to consumption and that is of the media content component, and implementing, by the client device, correct presentation after parsing the signaling information.

5. The server configured to implement the method according to claim 1, the server comprising:
a signaling configuration interface and generation module, configured to obtain layout information about the presentation layer layout, or layout update information and information corresponding to a content component, and make the obtained information into signaling information;
a signaling version management module, configured to manage version numbers of the signaling information, so as to send correct signaling information to a client device; and
a signaling sending module, configured to pack the signaling information into a data packet in accordance with a transmission protocol, and send the data packet to a specified client device.

6. The client device configured to implement the method according to claim 1, comprising:
a signaling receiving and parsing module, configured to receive a data packet that comprises the signaling information and that is sent by the server, parse the data packet into the signaling information, and check a version number, so as to transfer correct signaling information to a rendering module; and
the rendering module, configured to: according to the signaling information transferred by the signaling receiving and parsing module, present each presentation layer based on the layout, and correspondingly display a corresponding media content component and the presentation layer.

7. The client device according to claim 6, further comprising a user operation interface module, wherein
the user operation interface module is configured to: according to variable flags that are of the presentation layers and that are in the signaling information, inform a user of types and a range of the presentation layers that are variable, and transfer obtained personalized adjustment command of the user on the presentation layer to the rendering module for related adjustment; and
the rendering module is configured to change the presentation layout at any time according to an adjustment command of the user operation interface module.

8. A system configured to implement the method according to claim 1, the system comprising, comprising:
a signaling configuration interface and generation module, configured to obtain layout information about the presentation layer layout, or layout update information and information corresponding to a content component, and include the obtained information into signaling information;
a signaling version management module, configured to manage version numbers of the signaling information, so as to send correct signaling information to a client device; and
a signaling sending module, configured to pack the signaling information into a data packet in accordance with a transmission protocol, and send the data packet to a specified client device
a signaling receiving and parsing module, configured to receive a data packet that comprises the signaling information and that is sent by the server, parse the data packet into the signaling information, and check a version number, so as to transfer correct signaling information to a rendering module; and
the rendering module, configured to: according to the signaling information transferred by the signaling receiving and parsing module, correctly present each presentation layer based on the layout, and correspondingly display a corresponding media content component and the presentation layer, wherein
the server, configured to provide the media content component by using the presentation mode in which the one or more presentation layers superimpose, and sends the signaling information for describing the presentation layer layout to the client; and
the client device, configured to present the multimedia content assembly in a personalized manner according to the signaling information that is of the presentation layers and that is sent by the server side.

9. A system configured to implement the method according to claim 1, comprising:
a signaling configuration interface and generation module, configured to obtain layout information about the presentation layer layout, or layout update information and information corresponding to a content component, and make the obtained information into signaling information;
a signaling version management module, configured to manage version numbers of the signaling information, so as to send correct signaling information to a client device; and
a signaling sending module, configured to pack the signaling information into a data packet in accordance with a transmission protocol, and send the data packet to a specified client device
a signaling receiving and parsing module, configured to receive a data packet that comprises the signaling information and that is sent by the server, parse the data packet into the signaling information, and check a version number, so as to transfer correct signaling information to a rendering module;
the rendering module, configured to: according to the signaling information transferred by the signaling receiving and parsing module, correctly present each presentation layer based on the layout, and correspondingly display a corresponding media content component and the presentation layer, and
a user operation interface module, wherein
the user operation interface module is configured to: according to variable flags that are of the presentation layers and that are in the signaling information, inform a user of types and a range of the presentation layers that are variable, and transfer obtained personalized adjustment command of the user on the presentation layer to the rendering module for related adjustment; and the rendering module is configured to change the presentation layout at any time according to an adjustment command of the user operation interface module;

the server presents, the media content component by using the presentation mode in which the one or more presentation layers superimpose, and sends the signaling information for describing the presentation layer layout to the client; and the client device presents the multimedia content assembly in a personalized manner according to the signaling information that is of the presentation layers and that is sent by the server.

* * * * *